July 22, 1941.  M. L. SEVERY  2,250,069
MEANS FOR PRODUCING ELECTROSTATIC PULSATIONS
Filed March 9, 1936  6 Sheets-Sheet 2

Inventor:
Melvin L. Severy
Attorney
James A. Y. Koehl.

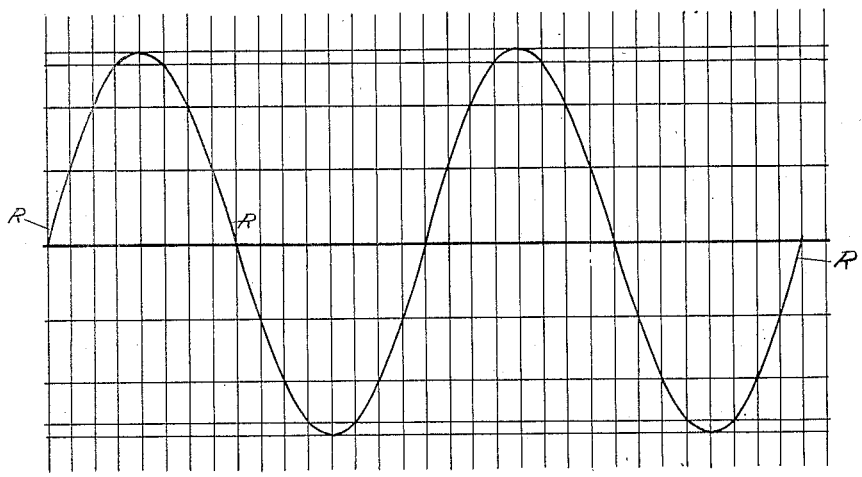
Fig. 18c
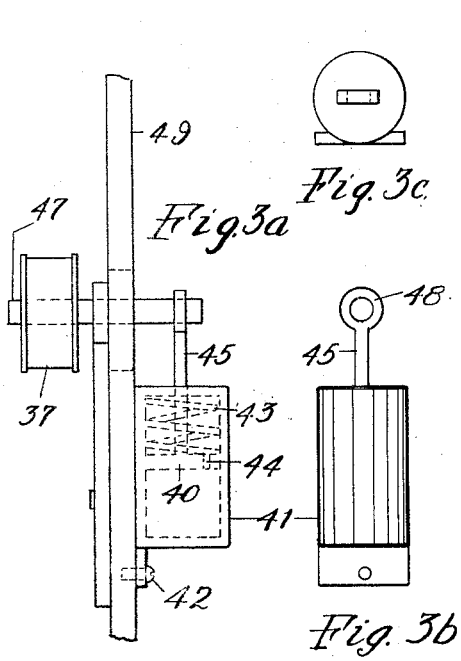
Fig. 3a  Fig. 3c
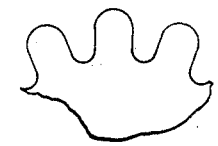
Fig. 8b
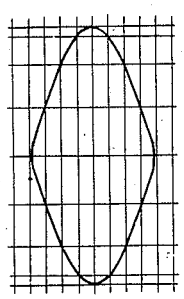
Fig. 18d
Fig. 3b
Inventor
Melvin L. Severy
James A. G. Koehl
Attorney July 22, 1941.  M. L. SEVERY  2,250,069
MEANS FOR PRODUCING ELECTROSTATIC PULSATIONS
Filed March 9, 1936   6 Sheets-Sheet 4
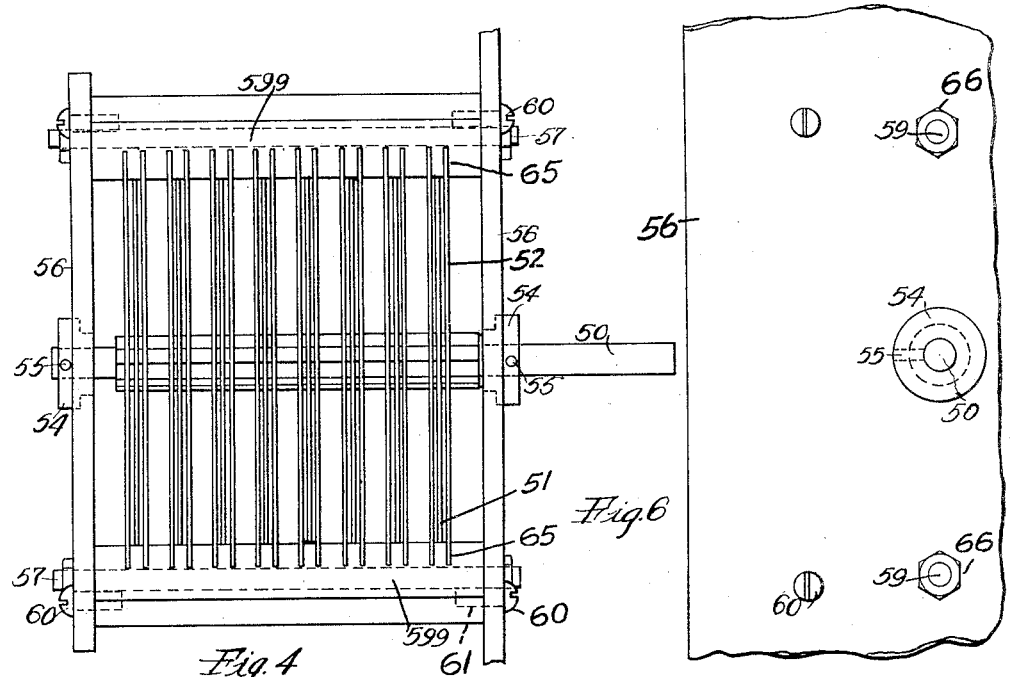
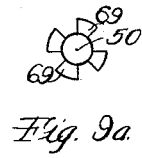
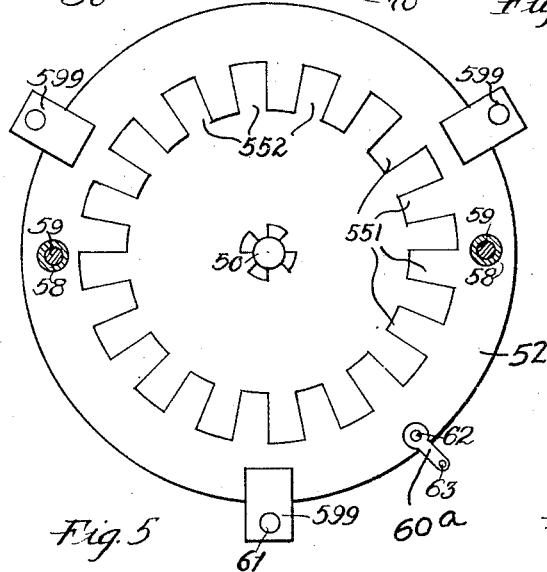
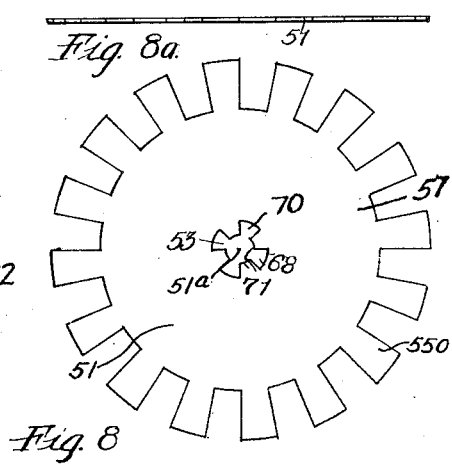
Inventor:
Melvin L. Severy
Attorney:
James A. T. Koehl.

July 22, 1941.  M. L. SEVERY  2,250,069
MEANS FOR PRODUCING ELECTROSTATIC PULSATIONS
Filed March 9, 1936  6 Sheets-Sheet 5

Inventor:
Melvin L. Severy
Attorney
James A. G. Koehl

July 22, 1941.    M. L. SEVERY    2,250,069
MEANS FOR PRODUCING ELECTROSTATIC PULSATIONS
Filed March 9, 1936    6 Sheets-Sheet 6
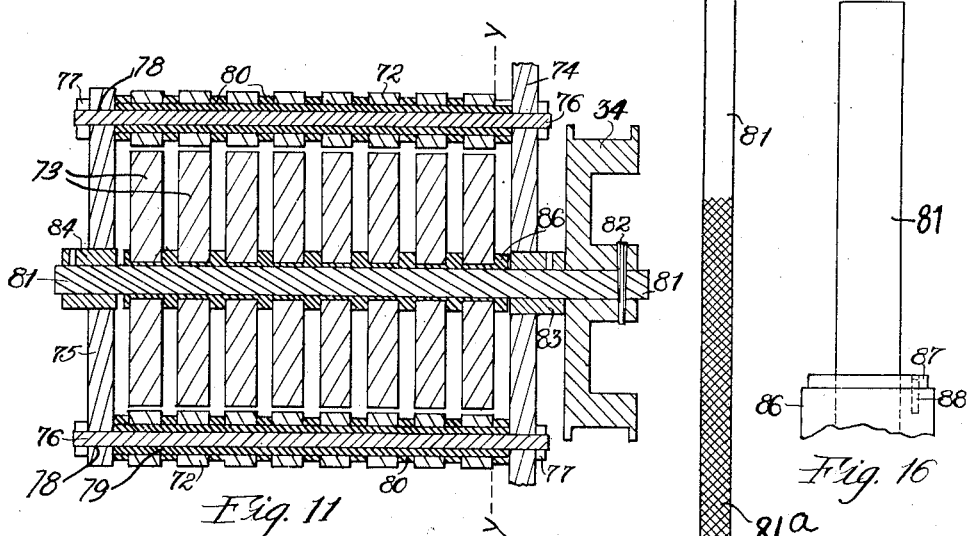
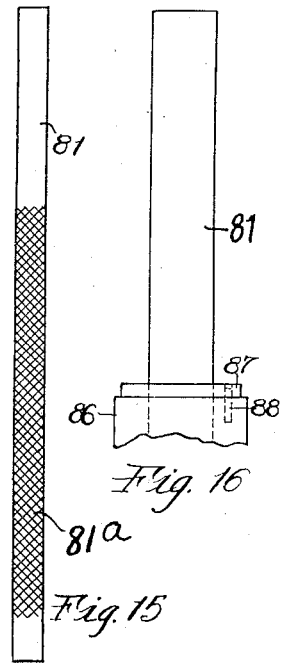
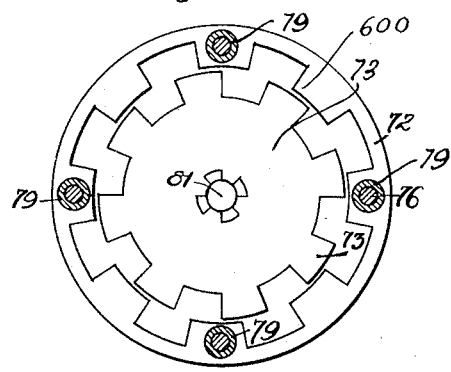
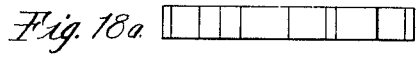
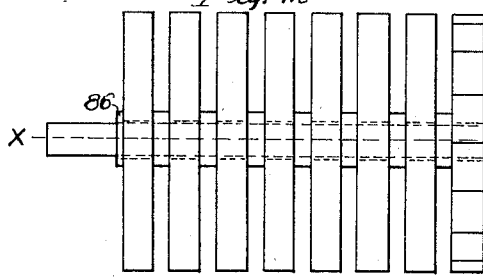
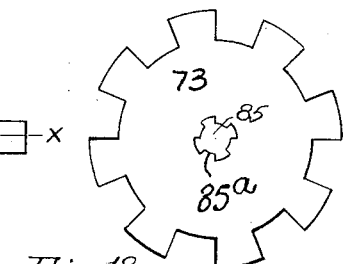
Inventor:
Melvin L. Severy
Attorney:
James A. G. Koehl.

Patented July 22, 1941

2,250,069

UNITED STATES PATENT OFFICE 2,250,069

MEANS FOR PRODUCING ELECTROSTATIC PULSATIONS

Melvin L. Severy, Los Angeles, Calif., assignor to The Vocalsevro Company of Chicago, Chicago, Ill., a corporation of Delaware Application March 9, 1936, Serial No. 67,922

2 Claims. (Cl. 175—363)

This invention pertains to means for the production of rhythmical pulsations of electricity through the agency of condensers; and has to do more particularly with the production of such rhythmic vibrations at a multiplicity of frequencies and of a wave-form suitable for use in a musical instrument employing the tempered scale.

Electrical pulsations may be produced in condensers in a variety of ways. Assuming two oppositely charged condenser plates, face to face with each other, and separated by a very small gap, a vibration in them may be produced by varying the thickness of the dielectric separating the plates, or by varying the nature of the dielectric. If the dielectric be air, a pulsation will be created, if the density of the air be changed, even though the gap be made constant; likewise the breaking down of the dielectric will cause a change. I have shown a way of creating rhythmical electrical pulsations through the agency of a condenser by periodically varying the thickness of the dielectric by bringing the oppositely charged plates nearer to and farther from each other by a motion sensibly perpendicular to their surfaces. I have shown this method as one of the means of creating rhythmical pulsations to be used in a musical instrument in my co-pending application, Serial Number 55,773, filed Dec. 23, 1935.

All these methods to which I have adverted are of a nature lending themselves to the production of relatively weak results requiring great enlargement. In an electronic musical instrument, which would be the type of instrument normally employing these electrical rhythmical pulsations, it is most desirable to produce tones of a great variety of timbres; and to do this most practically, cheaply, and efficiently, it is necessary to use tone-generators of definite frequencies, both for primes of the notes corresponding to keys pressed, and also for partials of other notes corresponding to primes associated with certain other keys of the manual, several of which said keys might be simultaneously pressed. Because of this, it is extremely desirable to produce electrical pulsations of as great power as is practicable, and it is one of the particular purposes of this invention to accomplish that result. This I achieve by rhythmically varying the capacity of two opposed oppositely charged members in close proximity to each other, in a way to permit the use of relatively very large active areas respecting both plates, and by the variation of the capacity fluctuation so produced from its full maximum to sensibly nothing, at any desirable periodicity, and with such increments and decrements of capacity as shall produce pulses of any desired wave-form suitable for musical uses.

Commonly this wave-form would be such as would produce pulsations of essentially sine-wave characteristics. In musical instruments employing the equally tempered scale, the vibrational frequencies of the notes making up any octave are not commensurate with respect to each other, so that if C were to have 32.33 vibrations per second, C# would have that number of vibrations multiplied by the twelfth root of 2, which is to say, multiplied by 1.05946; and the D's vibrational frequency would result from that of C# similarly treated, and so on in like manner throughout the rest of the notes of the octave.

It follows, therefore, that by putting like notes upon a revolving member having twelve such members, one for all the C's, another for all the C#'s, still another for all the D's, and so on, the incommensurate difficulties of the tempered scale can be completely overcome.

I show herein, as a part of this invention, such means of employing twelve moving instrumentalities. I also show a way of producing the notes of the tempered scale so perfectly as to be thoroughly serviceable, by the use of only six revolving members, as will be described later on herein.

In the few attempts that have been made to use electrostatically produced pulsations for the generation of the tones of a musical instrument, none, so far as I am aware, has been able to produce those relatively large changes of capacity which is a most important feature of the invention herein described.

Among the principal purposes of my invention are the following:

To provide an electrostatic generator for use in connection with an electronic musical instrument which shall be of sufficient power to serve for an instrument of the highest grade of musical excellence without that undue enlargement so prone to distort the results.

To provide a compact, thoroughly dependable, and cheaply built instrument requiring a minimum of servicing.

To provide an instrument with so few moving parts—and those of so light duty—that the structure will last indefinitely.

To provide cheap, easily constructed and durable means for producing tones of any desired wave-form, and particularly tones of sensibly sine-wave characteristics.

To provide means for using to the utmost the possibilities of all of the oppositely charged plates with respect to their capacitative change from maximum to practical nihility.

To provide a structure requiring but a single belt for the determination of its higher frequencies, its lower frequencies being produced with mathematical accuracy from these higher frequencies.

To provide another type of structure requiring but a single belt for the determination of all the frequencies of the instrument.

To provide a structure having pulsation-producing members which may be stamped, cast, moulded, die-cast, printed, electroplated, sprayed, photo-engraved, milled or otherwise formed in a quick, cheap, accurate, and highly efficient manner.

To provide a device, the parts of which are adapted to assist in rapid and cheap construction and assembly with a minimum amount of labor, and of that labor, a minimum amount of it skilled labor.

To provide means for avoiding, as far as possible, all distortions of the desirable wave characteristics, and particularly those distortions inherent in the use of a transformer.

To provide generators with rotors so arranged relative to their stators that bearing play—even very abnormal looseness—shall not produce a distortion which will show in the ultimate tone.

To design structures to permit of use of my preferred key-switch and tappet-switch systems, more fully shown and described in co-pending applications, numbered serially 55,774, filed Dec. 23, 1935, and 82,014, filed May 27, 1936.

To provide for the more perfect tonal reproduction of the generated impulses by the use of a plurality of especially adjusted loud speakers.

To provide a cheap, efficient, and very accurate means for control of the forms of the wave produced by my generators, containing a multiplicity of means for neutralizing even the smallest fortuitous errors which might occur in the shaping of some few of its vibration-producing areas.

To provide means whereby changing the form of some of the co-acting vibration-producing areas, without altering others, may produce the same effect as if a lesser degree of alteration were made in every area concerned.

To provide means whereby, when desired, the shapes of the active areas of the rotor and of the stator may be different and yet produce the same wave-form as if both said shapes were alike.

To provide means whereby the desirable relative power of the impulses generated at the different frequencies of the scale used may be quickly determined and permanently regulated.

To provide means whereby the multiple demands made upon pulsations of a single frequency may be segregated, either partly in groups of said demands or completely in unitary uses.

To provide means for the production of a great variety of tonal timbres, at the instant command of the performer.

To provide a means whereby the energy factor of the rotors may be doubled by having two stators associated with each of them.

To provide a form of device having the active sections of its coacting members at or near their peripheries thus making for larger sections.

To provide a form of device with the active sections of its members so disposed as to permit of their being milled or hobbed when desirable.

To provide a form of device the coacting members whereof may be stamped or milled to produce any desired wave-characteristic in the resultant pulsations.

To produce a form of device permitting stacked milling of its coacting members and the shaping of them to produce any desirable form of wave by the shaping of the cutter or otherwise.

To produce a form of device which will easily lend itself to the establishment of the proper relative prominences of the various frequencies produced by its coacting members, which prominences once determined may be made fixed for all future instruments of similar type.

To provide a device which shall be free from the extremely troublesome and expensive inductive coupling commonly inherent in the magnetic-pickup types of pulsation-generators.

To provide a device which, as shown, shall produce a constant level of volume or loudness irrespective of the number of notes simultaneously played, and yet which shall be readily adaptable to the more common practice where each note added to a simultaneously-played passage increases the volume or loudness thereof, while each note dropped from such passage decreases its volume or loudness, all as clearly set forth and claimed herein.

To provide coacting rotor and stator assemblies in which rotor members, each adapted in conjunction with associated stator or stators, to produce a definite number of pulsations per revolution, may be grouped upon and revolved by shafts having but six different speeds for an entire instrument, and in which, where desired, the rotor and/or stator elements may be stamped from sheets in an inexpensive and efficient manner.

To provide coacting rotor and stator assemblies so arranged that a plurality of the surfaces of either or both rotors and stators may be used to augment the power of the device and/or facilitate the plural simultaneous use of pulsations of the one periodicity.

To provide coacting rotor and stator assemblies having any desired number of inter-laminated rotor and stator plates adapted to produce in operation a single periodicity per coacting assembly or a plurality of periodicities.

To provide a simple grouping of parts and wiring layout most serviceable in certain types of instruments, in which the pulsations to be used may be taken off the line charging the stators through a blocking condenser.

To provide means for cheaply producing accurately timed electrical pulsations of sensibly pure-sine-wave characteristics, of relatively great power, and free from the inductive coupling of magnetic generators.

Further objects of the invention will become evident as the description proceeds.

The art of music has for its purpose the creation of emotional states through the agency of rhythm, melody, harmony, timbre, and volume, or loudness, and the ideal musical instrument should enable a composer writing for it to use to the utmost every one of these emotional possibilities, in absolute assurance that the performer rendering his composition would find in his instrument no bar to the proper interpretation of his work.

As at present constructed, the piano and organ types of instrument fail in a most important consideration, even forcing the composer, in order to get certain effects which he desires, to take along with them other effects which he not only does not desire but which ruin in whole or part those for which he is striving. A word will make this plain. Any chord will have a different emotional effect from a single note, and a complex chord will have an effect different from a simple chord, and it should be possible for the composer freely to choose any of these at any level of loudness or volume he may desire and to set it down in his score confident that the performer will be able to produce just what he has planned.

In keyboard instruments as now constructed this cannot be even approximately achieved. How, for example, is a pianist playing a single note, followed, perhaps, by five or six notes simultaneously struck, to keep his loudness level constant in both cases? He cannot be expected to do it, for, even if his technique would permit he certainly could not count the notes in every chord, and it might easily happen that the composer desired the one note to overbear the five or six, for it should be constantly borne in mind that a composer may have other reasons than mere loudness of the sound of many notes played at one time, for writing complex harmonies.

Were the loudness or volume level made independent of the number of notes simultaneously played, then the performer would have only to regulate his expression-control either in accordance with his own artistic feeling or with the directions on his score, and the composer would be able to write the most complex harmonies and have them rendered with zephyr-like delicacy or thunderous acclaim, whichever might suit his inspiration.

I have been able to achieve an instrument making this possible, and I show it diagrammatically herein as an important form of this invention at Figure 1 where, as will be seen, the loudness or volume level is kept constant during any constant position of the expression-control mechanism. The result of this arrangement is a smoothness and continuity of rendition not possible by existing methods. Furthermore, the entrance of a note into a passage already playing is more subtle and less intrusive and, as might be expected, notes leaving an existing harmony do so with less sense of abruptness.

This method of musical rendition would be easier for a beginner to learn than the method in vogue, but those who have already learned the older method will miss the constant changing of volume or loudness in accordance with the number of notes simultaneously played, but if they will spend a little time learning the very simple change in technique, it is believed that those with the best musical understanding will soon realize the superior expressive capabilities the new system affords them. For such as may not care to change either their technique or its results, I have provided in a companion application Serial No. 82,014, filed May 27, 1936, an alternative means which I desire it distinctly understood I contemplate using also in conjunction with this invention to which it is readily applicable, by which the loudness, or volume, normally increases as the number of notes simultaneously sounded increases after the manner common with the music of modern keyboard instruments as usually played, and which alternative means will require nothing beyond their already-learned technique.

I wish it distinctly understood that I do not confine myself to either one of these means, as both are clearly within the scope of my invention, and I may elect to use either the one or the other as circumstances and the public demand may direct, indeed, I may even use both in the one instrument without in the least departming from the spirit of my invention; neither do I confine myself to the use of any particular circuit whatsoever.

In the drawings:

Figure 1a is a schematic showing of an alternative form of the left-hand portion of Figure 1;

Figures 3a, 3b and 3c are details of portions of the belt-tightening mechanism shown in the right-hand lower corner of Figure 3;

Figure 4 is a plan view of a generator assembly of eight units for the eight rotors and sixteen stators;

Figure 5 is an end view of Figure 4, with the end-bearing plate removed;

Figure 6 is a view in elevation of a portion of the end-bearing plate;

Figure 8 is a view in elevation of one of the rotor members;

Figure 8a is a view in edge elevation of the rotor member, showing a convenient relative thickness;

Figure 8b is a fragmentary view in elevation of the rotor member illustrating a form which might be given to the teeth of the member shown in Figure 8a to produce in coaction with the dentitions shown in Figure 7 an approximate sine-wave form of pulsation;

Figure 9 is a view in elevation of the splined shaft upon which the rotors are placed and secured;

Figure 9a is an end view of the shaft shown in Figure 9;

Figure 11 is a vertical longitudinal section of a cylindrical type of generator taken substantially on the line X—X of either of Figures 13 and 14;

Figure 12 is an end view of the generator shown in Figure 11, the end bearing-plate being removed for the purpose of clearness;

Figure 14 is a view in elevation of a rotor assembly, the individual discs of which are secured together and spaced apart from each other by a suitable member of insulating material;

Figure 15 is a view in elevation of the knurled shaft upon which the individual rotor discs are mounted;

Figure 16 is a partial view in elevation of the shaft shown in Figure 15 showing the end thrust bearing construction;

Figure 18 is a view in elevation of a rotor disc, the active surfaces of which are parallel to the axis of rotation of the disc;

Figure 18a is an edge view of the disc shown in Figure 18;

Figure 18b is an edge view of a slightly different form of rotor disc, with the teeth or dentitions thereof formed to produce an approximately sine wave form of pulsation;

Figure 18c is a diagram showing two waveforms of pulsations, the curved one representing a sine-wave;

Figure 18d is a diagram approximating the form of tooth shown at Figure 18b.

Figure 1:
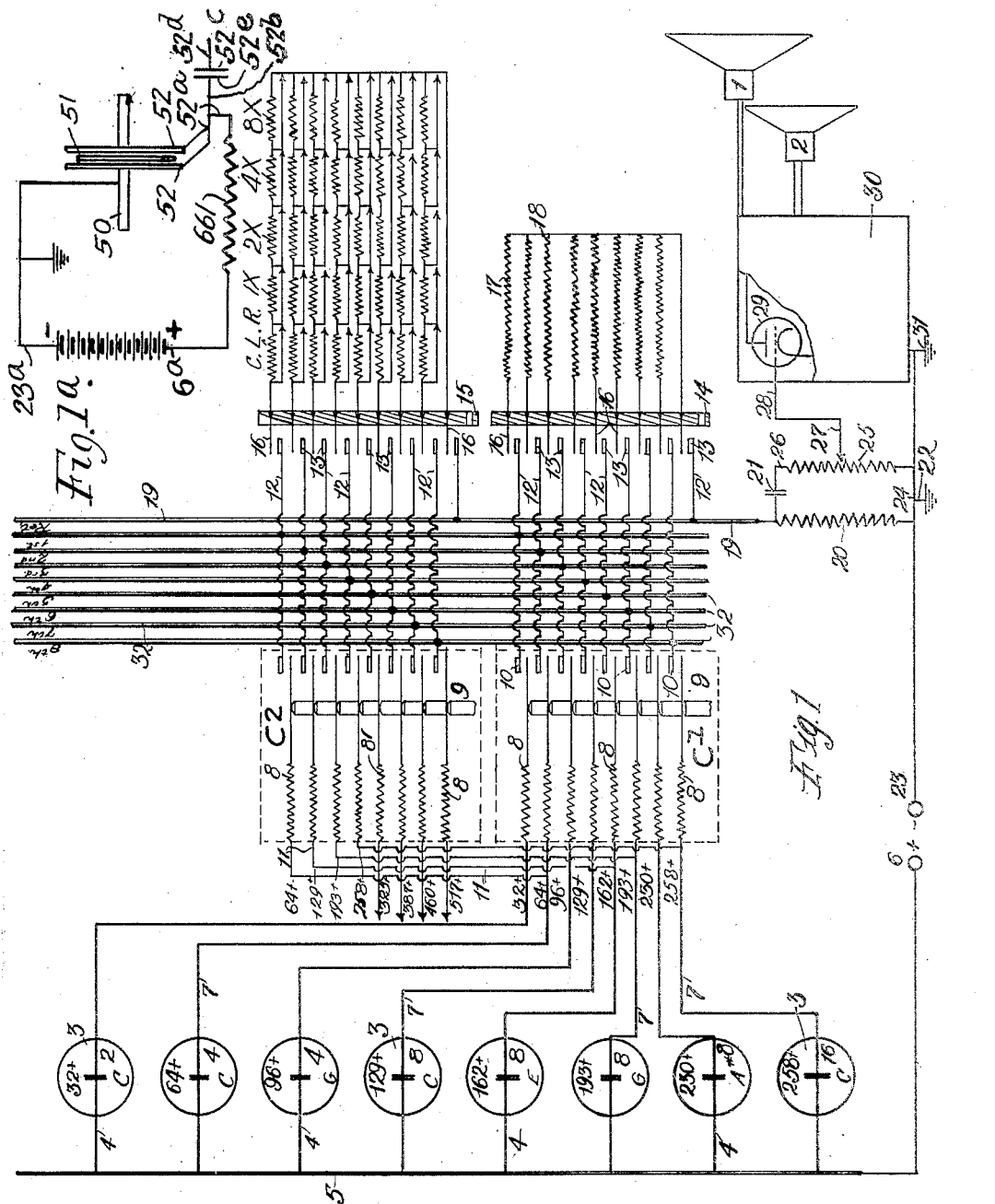
Figure 1 shows schematically, and for the sake of illustration the wiring, a typical set of electrostatic generators, which may be of the type shown at Figure 4, or of any other suitable type, and of the partial-mixing reproducing system with which said generators are associated.

Referring now more particularly to the wiring diagram shown in Figure 1 of the accompanying drawings, the eight rings 3, at the left of said figure, are intended schematically to represent static generators producing pulsations of the approximate frequencies indicated within each said circle at its top, ranging from 32 plus cycles per second for the top circle, down to and including 258 plus cycles for the lower circle. These eight circles, representing schematically the eight generators necessary to produce rhythmical pulsations serving the note C1 of 32 plus cycles per second, and all the other notes associated with this first partial or prime of 32 vibrations, as upper partials.

Figure 2:
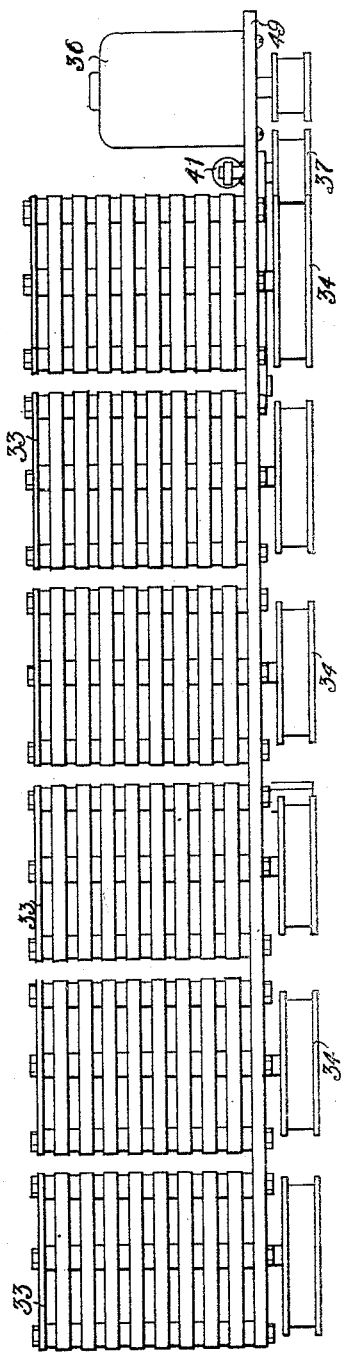
Figures 2 and 3 are, respectively, a top view and a side elevation of a complete assembly of generator units, one for each letter of the scale, shown in detail at Figure 11.
Figure 3:
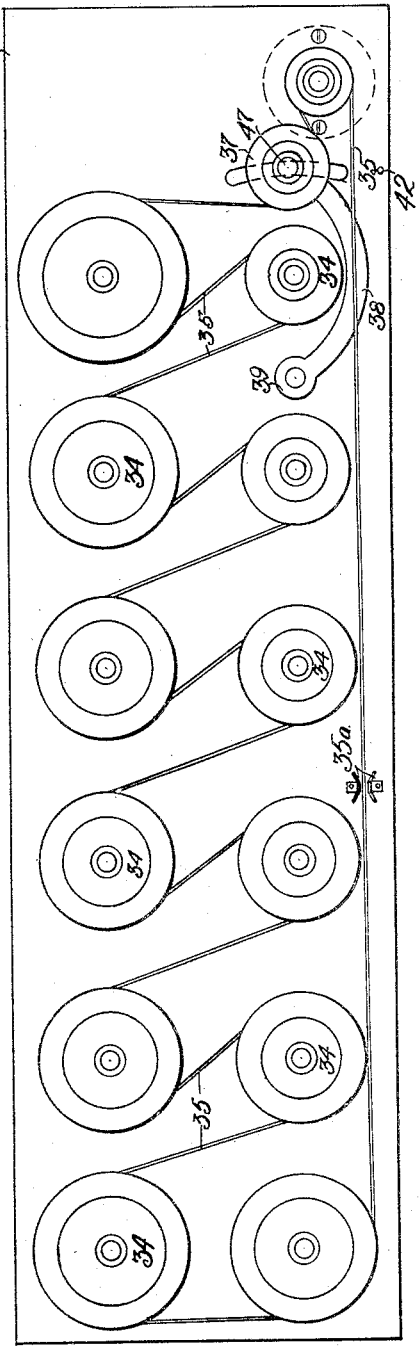
Figure 13:
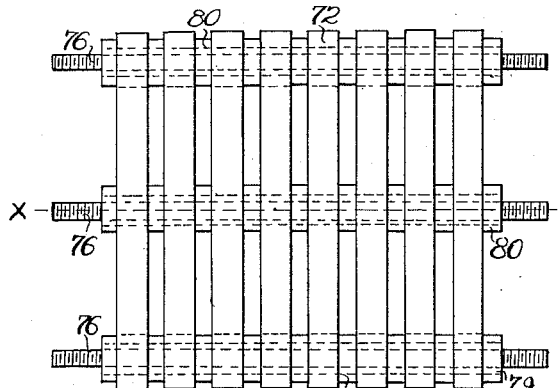
Figure 13 is a view in elevation of the stator ring assembly.

For a clear understanding of the invention schematically illustrated in said Figure 1, it is necessary to remember that in carrying the invention into practice, use is made of the assemblies shown at Figures 2 and 3. Regarding the generators above referred to, reference should be had to Figure 11. In this type of instrument, all like letters of the octave are upon one rotor, there being one rotor for all of the C's, another for all of the D's, and so on through the letters of an octave, so that a C rotor unit, like that shown in said Figure 11, will have eight coacting assemblies of pulsation-producing generators, said assemblies being in octave relation to each other, and each of these units will be identical respecting said coacting assemblies, regardless of the letter of the octave to which said unit is confined, theonly essential difference being in the driving pulleys which serve in each case to turn the units at a correct, constant, and different speed from all the other said units, as will be more fully shown and described as the description proceeds.

By referring to the uppermost circle 3 of Figure 1, there will be found in it at the bottom the notation C², and in the middle of said circle, as in the middle of all the other circles shown, will be found the symbol for a condenser, indicating with respect to this upper circle that this condenser represents a note C, which is produced by coacting instrumentalities having two dentitions or equivalents each, the rotor plate revolving at a speed to produce 32 plus vibrations per second, which speed would be 16 plus revolutions per second, and all of the C's of the instrument, when of the type having a 12-unit assembly, would be generated from co-acting instrumentalities mounted on this same shaft, turning at the same speed.

As we look down the line of circles, selecting those marked at their bottoms as representing C notes, it is observed that the next or second one is marked as indicating that the generator rotor for this note has four teeth; the fourth C, similarly marked as indicating that its generator rotor has eight teeth, and the last one of said C's similarly marked as indicating that its generator rotor has sixteen teeth, the vibrations of these C's ranging from 32 plus per second to 258 plus per second.

In a system adapted synthetically to produce at will any number of different tone qualities, it is essential to keep in mind that all such naturally produced tone qualities are the result of vibrations representing partials, the first partial, prime or fundamental, usually the pitch-giving partial of the tone produced—being associated with selected upper partials of varying degrees of loudness, and that these said upper partials have frequencies which are multiples of the frequency of the prime. If, therefore, C of 32 vibrations per second be the prime, the partials which may be associated with it in a synthetic system comprising eight partials, will be those set down in the eight circles shown in Figure 1, the uppermost C or first partial having two teeth and producing 32 plus vibrations, the second partial being still a C, and the octave of the first partial having four teeth and producing 64 plus vibrations per second. These two partials being, of course, like all the other C's on the one shaft rotating 16 plus revolutions per second. The third partial of 96 plus vibrations per second, being in the same octave as the second partial, will have four teeth, but being a G, as is also its octave, the sixth partial, it will, with said octave, be on a G shaft, turning at a speed different from and faster than the C shaft. The fourth partial and fourth circle represent a note of 129 plus vibrations per second, being a C produced by eight teeth. The next, or fifth partial, will have a periodicity of 162 plus cycles per second, and this will be an E, having eight teeth and carried by a shaft revolving at a speed different from and slower than the speed of the G shaft. The next circle, representing the sixth partial, is another G, is the octave of the third partial, is on the same shaft therewith, has 8 teeth and produces 193 plus cycles per second. The next, or seventh partial, is an A# in the same octave as the sixth partial, has eight teeth, and revolves at a speed different from and greater than that of the G shaft, producing 230 plus vibrations per second. The eighth or last partial is a C, having sixteen teeth, revolving at 16 plus revolutions per second and producing 258 plus vibrations per second.

Connected to the left-hand pole of each of the condensers, centrally located within the circles, is a wire 4 leading to a common wire 5, which is supplied with plus current, as indicated at 6, for the purpose of charging the left-hand pole of each condenser. Connected to the other poles of these condensers by wires 7 are resistors 8, and each of these lines is identified by its vibrational number, so that there need be no confusion.

It will be observed that the two circuit-closing, key-operated stickers 9 are associated respectively with C¹ and C² notes of the manual, as clearly marked and shown by the associated vibrational numbers at their left. The lower of the stickers 9 operates the switches adapted to put all of the eight generators shown, in electrical contact with the eight bus-bars 10, shown in connection with the C1 system under consideration. This C1 system is supplied with all of its partials, from the first to the eighth, doubly inclusive, and the C2 system above it is supplied by cross-wires 11 with those partials, the vibrational frequencies of which are common to both the C1 and C2 partial systems. Those partials, not common to both systems as aforesaid, to-wit: an E, a G, an A# and a C being indicated by open-circuit lines and extending to the left, and terminating in arrows to indicate that they run to generators not shown.

The bus-bars 10 are connected by wires 12 with other bus-bars 13 pertaining to timbre-reguluating tappet-switches, the lower of which, controlled by the tappet-operated sticker 14 indicates a partial-mixing tappet-switch, representing a fixed or built-in quality of tone, and the upper of which, having a tappet-operated sticker 15, represents my permuting type of partial-mixing tappet-switch mechanism.

It will be seen that when sticker 14 is pulled downward by its associated tappet (not shown), wires 16 are laid upon bus-bars 13 and current is passing through the fixed resistors 17 and to the return wire 18, and thence by the lower switch-member 13 and bus-bar 19 to the resistor 20, and therethrough to ground 22. The bus-bar 19 is also connected to the left plate of condenser 21, the right plate of which is connected to a resistor 25 and therethrough to wire 22, which grounds the minus pole 23 of the current-source at 24 and 31.

Slidable along the resistor 25 is the finger 27, adapted to take an adjustably variable current therefrom, and to transmit it via the wire 28 to the grid of the tube 29, this hook-up being readily understandable to those familiar with the electronic art. It replaces here the customary transformer over which it has some advantages. In this particular case, the impedance of the static system being relatively high, it would not commonly be necessary to have an impedance-matching device such as a transformer, and avoiding the use of the transformer keeps the distortion inevitable thereto out of the circuit.

30 indicates the amplifier cabinet grounded at 31 and delivering energizing current to the speakers 1 and 2. These speakers may well be adapted, one to favor as perfectly as possible, the lower section of the instrument's manual, and the other to do the like for the upper section, and they may be connected to the enlarging system in any desirable way.

As there will be times when more than one quality will be wanted at once, even upon a single manual, it is necessary to have a plurality of partial-mixing tappet-switches capable of being served by almost any of the key stickers, 9, of a manual. To this end, cross connections 32 connect together similar lines in all of the partial switches which may happen to be in use.

Current-limiting resistors marked "C. L. R.," are shown in the upper or permuting type of partial-mixing tappet-switch for the purpose of making possible true chorus effects by the simultaneous pressure of a plurality of tappets. These current-limiting resistors are not shown individually in the lower, or fixed form of switch, but their resistance is suitably figured into each resistor-line thereof to the end that these partial-mixing tappet-switches of a fixed or built-in form, may also be capable of true chorus effects when a plurality of them or some of them and some of the permuting switches, are simultaneously operated.

I do not consider it needful to go further into detail regarding this schematic showing of Figure 1, since I have a co-pending application, Serial Number 82,014, filed May 27, 1936, especially devoted to the showing of the details of the forms and uses of my synthetic partial-mixing tappet-switch devices.

Figure 1a is a schematic showing of an alternative form of the left-hand portion of Figure 1, in which a pulsation-producing generator, here shown as a revoluble rotor plate, 51, coacting with two stator plates, 52—is shown in somewhat fuller detail. The rotor shaft, 50, is connected to the negative pole, 23a, of a power supply, the positive pole, 6a, of which is connected through a high resistor, shown as of the order of 250,000 ohms, and a wire, 52a, to the stator plates, 52, from which the pulsations to be used are taken off. A branch wire, 52b leads from 52a to the left plate, 52e, of a condenser serving to block the direct current from the power pulsating supply while passing the pulsating current taken off the stators, 52. From the right-hand plate, 52c, of the blocking condensers shown, a wire, 52d, connects with the left-hand end of a resistor shown at 8 of Figure 1, the rest of the layout being as shown in said Figure 1.

It is essential that the rotor and stator members shall in operation, be of different polarities with reference to each other, but it is a mere matter of convenience with respect to the layout used, whether the rotors or the stators represent the positive element of the coacting group, and I desire it understood that I may connect the poles of my power supply in whatever way, and by whatever system I may find most convenient with respect to the type of instrument under consideration.

The action of that part of the system shown at Figure 1a is as follows: The rotor, 51—see also Figures 4, 5, and 8—turns, the active areas 550 thereof and the like areas 551 of the coacting stators 52 come into juxtaposition, and a condenser is thus formed. This causes a current to flow in the "charging" wire and, since the high resistor 661 is in this "charging" line, current flows through it. The current flow through the resistor 661 develops a voltage-drop at point 52a, which is of lower potential than the charging current before the resistor. As the rotor continues to turn, the active areas 550 face empty spaces 552 in the stators 52 opposite them, and the capacity of the condenser is destroyed. The current in the condenser is, therefore, discharged, as there remains no capacity, and point 52a returns to its original potential. Thus a current is developed which fluctuates in accordance with the capacitive variations of the generator. Since the potential is considerably above the point at ground, it is necessary to introduce a blocking condenser, 52c, before feeding the fluctuating current to the key-switches through the resistors, not shown in Figure 1a, but shown at 8 of Figure 1.

Referring now to Figure 2: 33, etc., represent six of twelve units, one of which is shown at Figure 11, and 34, 34, represent the pulleys propelling them, said pulleys 34 being driven by a motor 36 through a continuous belt 35, passing about a tensioning pulley 37. The driving motor 36 is shown in Figure 2, and is indicated in dotted line in Figure 3.

Referring now to Figure 3: The lay-out of the pulleys 34 will be clearly seen, and the general lay-out of both Figures 2 and 3, but as applied to a different tone-generating means—will be found clearly set forth in my co-pending application, Serial No. 55,774, filed December 23, 1935.

The pulley or idler 37, serving to regulate the tension of the belt, 35, rotates upon the end of a lever 38 pivoted at 39, adapted to vary the tension of the belt according as the rightmost end of said lever moves upwardly or downwardly. To prevent the establishment of a rhythmic swing on the part of said lever 38, which would immediately show in the tones produced, I employ the mechanism shown at Figures 3a, 3b, and 3c, and the principle whereof, though variant somewhat as to details, is clearly set forth in my co-pending application last referred to.

The arm 38 is prevented from establishing any to-and-fro rhythm, due to the fact that any movement up or down causes a displacement of plunger 40 moving in the cylinder 41, which is filled with a fluid on both sides of the plunger. A small hole 44 permits the passage of this fluid from one side to the other of the plunger as its position is shifted in the cylinder, but the hole is so small that it resists any rapid movement of the plunger. Above the plunger is a spring 43 serving to force the plunger downwardly and to tension the belt 35, in which effort it is assisted by the weight of the arm 38 and the pulley 37, together with any added weight which might be found necessary. It follows, therefore, that when the motor 36 starts and the arm 38 would be inclined to go into rhythm, it cannot do so since it cannot force the fluid through the small hole 44 (see Figure 3a) in the piston 40 fast enough to permit the reciprocation of said piston at any period likely to produce a rhythmic movement. The connecting rod 45 of said piston is formed with an eye 48 through which is inserted the axis 47 of the pulley 37, so that the cylinder may swing upon its pivot 42 to compensate for the swinging of the arm 38 about its pivot 39. The cylinder 41 is pivoted at 42 upon the wall 49 of the rotor assembly as shown at Figure 3.

The prime mover 36 may be a synchronous motor or any suitable equivalent thereof. I refer only briefly to it, since it is treated very fully in my aforementioned co-pending application, Serial No. 55,774.

In Figure 4, 50 is a shaft upon which are mounted the rotors 51, which revolve with said shaft between their associated stators 52. This shaft is shown in detail in Figures 9 and 9a, and is splined for accommodation in the grooves 53 in the rotor discs, the construction being such that after initially assembling these parts, the shaft can be turned slightly, whereby the short feather sections of the shaft will coact with the discs to thus secure said discs against longitudinal movement on said shaft.

The shaft 50 turns in bearings 54, and as shown in Figure 4, said bearings are provided with oil holes 55, enabling the smooth ends of the shaft to be readily lubricated. Said bearings are pressed into end plates 56, a portion of one of which is shown at Figure 6. These plates are also clearly shown at Figure 4 wherein it will be noted that rods 57, passing through tubes 58 of insulating material, serve to hold the plates in rigid spaced relation to each other. The ends of said rods have nuts 66, adjustable thereon and adapted for clamped engagement with the outer faces of said plates.

Combs 599 of suitable insulating material are disposed between the plates, parallel to the axis of the shaft 50, and are slotted transversely at spaced intervals from each other to accommodate adjacent peripheral portions of the stator members 52. These combs 599 are shown positioned 120 degrees apart, about the periphery of the stator as will be appreciated upon reference to Figure 5.

By referring again to Figure 4, it will be seen that the aforestated combs are secured between, and correctly separate, the end plates 56, by screws 60 passing through holes in the end plates and into corresponding holes 61 in the ends of the combs. By observing the rightward end of the shaft 50 in said Figure 4, it will be seen that the end-play is regulated by engagement of the end of the enlarged spline against the right-hand bearing 54.

Referring to Figure 5, which represents a stator positioned in its retaining combs, it remains only to be said that a soldering lug 60a is secured at 62 to said stator, the hole 63 therein, serving for attachment to said lug of the stator wire.

Figure 7:
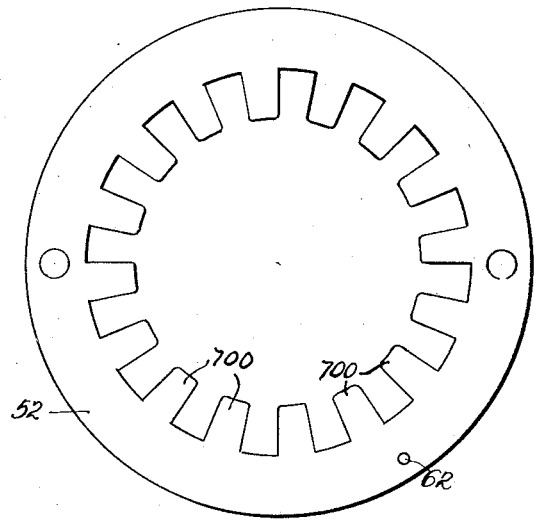
Figure 7 is a view in elevation of one of the stator rings.

Upon reference to Figures 7, 8, and 8a, both the stator shown in Figure 7 and the rotor shown in Figure 8 are struck from the same piece of sheet metal, approximately of the thickness shown in Figure 8a. Thus it follows, that in the process of stamping the metal, the stator and the rotor are produced in a single operation, the rotor representing the core or all that part of the metal, circumscribed or bounded by the internal toothed contour of the stator. In Figure 7, the teeth 700 have their corners rounded to indicate that the form of the wave produced may be modified in this manner. In Figure 8b, the rotor dentitions therein shown can be used for the sake of approaching more nearly to the sine-wave form. If the teeth be of the form shown at 8b, a wave that will be very close to the sine-wave shown at R, R, in said Figure 18c will be produced. The form of the waves produced may be regulated to a nicety by a little care in the shaping of the coacting dentitions.

As a rule, music is best served when the partials composing its timbres have true sine-wave characteristics, but there are certain qualities which are very beautiful, as for example, the violin, the characteristic wave-form of whose partials differ radically from the sine-wave more commonly desired, and by my invention herein disclosed, it is perfectly possible to reproduce any of these wave-forms, for they can all be mathematically figured to a nicety.

Figure 10:
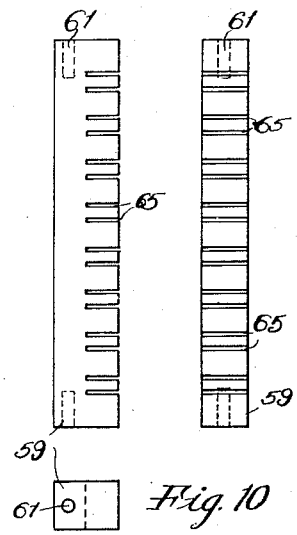
Figure 10 is a group view of the moulded combs or spacers, which may be used for the placement of the stators.

Upon further reference to Figures 6 and 10, it will be noted that the combs 559 are of corresponding lengths so that when firmly clamped between the aforementioned end plates 56, the slots 65, 65, in one comb are circumferentially alined with the corresponding slots in the remaining combs in the annular series employed, whereby, all the stator members, the peripheral portions of which are received in their complementary comb slots, will be held correctly spaced apart relative to each other and relative to the rotors with which said stator members coact. Thus, the rotors may revolve very freely between their correlated stator members. Any slight end play of the shaft 50, carrying with it all its associated rotors, will not materially alter the tone produced, the reason being that by just so much as a rotor is thrust rightward, see Figure 4— toward the stator to the right of it, tending to increase the reaction between it and said stator, it is carried away by just so much from its other coacting stator, thus weakening the reaction at that point to exactly compensate for the gain produced by its rightward motion. For this reason, any small amount of end play in the rotor shaft is not of serious consequence. If now it were possible for looseness in the bearing of the shaft to permit an axial displacement tending to place the rotors out of parallelism with the stators, this also would be automatically neutralized as to any change in power, for reasons similar to those already given. These features constitute an important part of my invention for, as pointed out in my co-pending application, Serial No. 55,774, with reference to Figures 4, 5 and 6, it being of the utmost importance to maintain a constancy in "pick-up" efficiency if the best results are to be obtained. In said application, the function just referred to is accomplished by a novel belt arrangement at one end of each rotor shaft and by magnetic or other means at the opposite ends of said shafts. A similar belt arrangement is employed herein and fully disclosed in Figure 3, and I wish it understood that I may apply said magnetic or equivalent means to the ends of the shafts 50, opposite the driver pulleys 34. The means I have illustrated in Figure 4 is still another way of rendering nugatory any reasonable wear or faulty workmanship in the shafts employed, and their associated bearings.

Upon again referring to Figures 8, 9 and 9a, the radial recesses 68, formed when punching the central portion of the rotor 51 to provide the shaft opening 51a, are adapted to have passed therethrough the stub or extended portions 69 of the shaft splines. When the rotors are placed upon the shaft and made to coincide with their complementary, circumferential grooves 70 between adjacent annular series of said stub or extended portions 69, the rotors are turned sufficiently to cause said portions 69 to coact with the inwardly extending lugs 71, whereby the rotors will be frictionally secured to the shaft and confined against axial as well as rotational movement relative to said shaft, the construction and arrangement serving also to mount the rotor rigidly at right angles to the axis of said shaft.

In Figure 11 I show coacting assemblies of pulsation-producing members, the active surfaces of which are parallel with the axis of rotation of the inner or rotor members, as will be clearly evident upon reference to Figure 12, where 72 indicates the outer dentated annulus or stator, and 73 the inner revoluble dentated rotor. The assembly includes an end plate 74, next to the pulley 34, and an end plate 75. These plates are held together by rods 76 which extend through openings 78 in said plates. The ends of said rods are provided with adjusting nuts 77 adapted to have clamped engagement with the outer faces of said plates. Four such rods are employed and arranged in an annular series, and each thereof is passed through a tube 79 of suitable insulating material, the ends of which bear firmly against the inner faces of said plates when the nuts 76 are adjusted upon the rods as intended. As shown in said Figure 11, the tubes 79 pass through the body portions of the stator members 72 and through spacing washers 80 of insulating material.

The pulley 34 is secured to the shaft 81 by a pin 82 and said shaft is journaled in bearings 83 and 84 pressed into the end plates 74 and 75. The rotors are each formed with a central opening 85 similar to the opening at the center of the aforestated rotor shown in Figure 18. The shaft 81, in this form of my invention is knurled as indicated at 81a in Figure 15, whereby the inwardly extending lugs 85a in the rotor openings 85 can have such connection with the shaft as will serve to hold the rotors concentrically mounted upon said shaft. When the rotors are positioned upon the shaft to provide their correct relationship to each other, suitable binder material is forced axially through the entire series of rotors as shown at 86 in Figure 11. It therefore follows that by reason of the structural and functional relationship of the aforestated parts to each other and the method employed to secure proper spacing of the rotors, said rotors become a fixed part of the shaft and are therefore held firmly against rotational movement relative to said shaft as well as from sliding axially thereof.

Upon referring to Figure 16, which is an enlarged view of the end of the rotor-carrying shaft 81, it will be seen that at one side of the portion 86 of the insulating and spacing material 86 is a metallic washer 87 to take the end-thrust of the shaft, and, to prevent this washer from rotating relative to the material 86 and said shaft, a pin 88 is employed to secure the bearing 83 against rotation relative to the confronting end of the material 86, thus preventing wear upon the latter.

By observing carefully the construction of the rotor and stator assembly shown in Figure 11, it will be seen that by making the rotors slightly thinner than the stators, or vice versa, no reasonable end play of the shaft 81 will affect the tone produced. Furthermore, should the bearings be worn so as to permit slight movement of the shaft across its normal axis, this, too, would be compensated for in the case of each coacting assembly, as already pointed out in another connection. The attainment of a construction so automatically compensatory as to permit even abnormal wear and relatively unskilled workmanship, without disastrous results, is a very important feature of this invention.

Referring now to Figures 18a and 18b, it will be noted that the dentitions or toothed projections herein illustrated are of different shape, though they are both adapted to produce the same number of vibrations per revolution. These two figures illustrate how easily the shape of the wave produced may be changed, either by alteration of the shape of the teeth of the stator alone, the shape of the teeth of the rotor alone, or the shape of the teeth of both or, in some cases, even by the change of the shape of certain of the teeth in any of the members of a coacting assembly.

Figure 17:
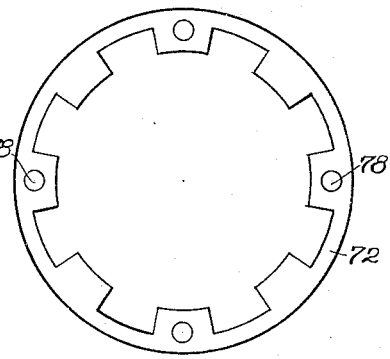
Figure 17 is a view in elevation of the stator ring shown in Figure 13.

In the case of the form shown in Figure 18a, the form of the wave produced by the rotor shown in Figure 18b, rotating either with a similarly formed stator dentition or with a stator dentition like unto that of Figure 17, would tend to be of the form shown at R, R, in said Figure 18c, the shape of the dentitions of 18b being approximately that shown in Figure 18d.

If other wave-forms be desired, they may easily be produced by changes of shape of dentition, as already pointed out. Not only this, but the form of wave may be changed electrically in ways so well known to the art that they need not be mentioned here.

Where, in the specification or claims, I have referred to active areas or dentitions, or the like; and to inactive areas, spaces, open spaces or the like, I wish to be understood to mean with respect to the active areas, surfaces, dentitions, or the like, those portions capable of and designed for, receiving electrical charges; and, with respect to the inactive areas, spaces, or the like, those portions not thus capable.

In practicing my invention there are a variety of electrical circuits which are practicable, two of which I have shown herein, but I do not limit myself to these specific forms as I consider any suitable and convenient wiring layout quite within the province of my invention as set forth and claimed herein.

What I claim as my invention is:

1. A device for electrostatically producing electrical pulsations at a predetermined tone frequency comprising a continuously varying condenser embodying a rotary shaft provided with a primary electrode embodying a rotor fixed to said shaft and having a circular series of similar capacity areas, means for imparting continuous unidirectional motion at an assigned angular velocity to said shaft, a secondary electrode comprising a pair of stators axially spaced apart from each other a distance providing an air dielectric between them, each stator having a circular series of similar capacity areas, said rotor disposed in the space between stators and having its capacity areas capacitatively related to respective capacity areas of the stators and adapted to scan same during continuous unidirectional motion of said shaft and periodically vary the capacity of the condenser and electrostatically produce said electrical pulsations, and an output conductor common to said stators.

2. A device of the class described comprising a mounting having a rotary shaft journaled therein, a plurality of similar, continuously varying condensers, means for continuously driving said shaft unidirectionally at an assigned angular velocity, each condenser comprising a rotor fixed to said shaft and a pair of stators axially spaced from each other to provide an air dielectric therebetween and in which the rotor is disposed, said rotor having a circular series of identical capacity areas, the stators each having a circular series of identical capacity areas, the capacity areas of one stator of said pair of stators being disposed axially opposite the capacity areas of the other stator of said pair and capacitatively related to the capacity areas of the rotor and coacting therewith simultaneously and periodically to vary the capacitance between all capacity areas of said stators and electrostatically produce electrical pulsations of predetermined tone frequency when said condensers are polarized and the shaft is in continuous motion as aforestated.

MELVIN L. SEVERY.